United States Patent
Sree Prakash et al.

(10) Patent No.: US 11,954,474 B2
(45) Date of Patent: Apr. 9, 2024

(54) GENERATING COMPLIANT CONTAINER IMAGES VIA EMBEDDINGS

(71) Applicant: International Business Machines Corporation, Armonk, NY (US)

(72) Inventors: Ashok Pon Kumar Sree Prakash, Bangalore (IN); Akash Nayak, Raipur (IN); Giriprasad Sridhara, Bangalore (IN); Padmanabha Venkatagiri Seshadri, Mysore (IN); Harikrishnan Balagopal, Thrissur (IN); Pablo Salvador Loyola Heufemann, Tokyo (JP); Amith Singhee, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 17/806,739

(22) Filed: Jun. 14, 2022

(65) Prior Publication Data

US 2023/0401051 A1  Dec. 14, 2023

(51) Int. Cl.
*G06F 8/61* (2018.01)
*G06V 10/74* (2022.01)

(52) U.S. Cl.
CPC .............. *G06F 8/63* (2013.01); *G06V 10/761* (2022.01)

(58) Field of Classification Search
CPC ................................ G06F 8/63; G06V 10/761
See application file for complete search history.

(56) References Cited

U.S. PATENT DOCUMENTS

| | | | |
|---|---|---|---|
| 7,370,318 B1 | 5/2008 | Howe | |
| 9,182,980 B2 | 11/2015 | Campbell | |
| 10,078,577 B2* | 9/2018 | Thomas | ................... G06F 8/63 |
| 10,142,370 B2 | 11/2018 | Goyal | |
| 10,169,209 B2* | 1/2019 | McPherson | ......... G06F 9/45558 |
| 10,324,696 B2* | 6/2019 | Bhat | ......................... G06F 8/60 |
| 10,404,474 B1* | 9/2019 | Caceres | ................ H04L 9/3268 |
| 10,908,887 B2* | 2/2021 | Bhat | ......................... G06F 8/63 |
| 11,294,971 B1* | 4/2022 | Gokhan | ............... G06V 10/761 |

(Continued)

FOREIGN PATENT DOCUMENTS

CN   112015376 A   12/2020

OTHER PUBLICATIONS

Doan et al., "DAVS: Dockerfile Analysis for Container Image Vulnerability Scanning", 2022, ResearchGate (Year: 2022).*

(Continued)

*Primary Examiner* — Wei Y Zhen
*Assistant Examiner* — Junchun Wu
(74) *Attorney, Agent, or Firm* — Stephen R. Yoder

(57) ABSTRACT

A method, computer systems and program product to import non-compliant container images is provided. A processor receives a non-compliant container image, wherein the container image is not compliant with a target computing environment. A processor extracts a one or more embeddings from the non-compliant container image. A processor compares the one or more embeddings from the non-compliant container image to a plurality of one or more embeddings from an image catalog. A processor identifies a similar image from the image catalog based on the comparison of layer embeddings from the non-compliant container image and the similar image. A processor deploys the similar image in the target computing environment.

14 Claims, 6 Drawing Sheets

(56) References Cited

U.S. PATENT DOCUMENTS

| | | | | |
|---|---|---|---|---|
| 11,758,069 | B2* | 9/2023 | Stanley | G06F 16/51 |
| | | | | 382/100 |
| 11,789,723 | B2* | 10/2023 | Suarez | G06F 8/63 |
| | | | | 713/168 |
| 2016/0314380 | A1 | 10/2016 | Abdulkader | |
| 2017/0177877 | A1 | 6/2017 | Suarez | |
| 2017/0212830 | A1* | 7/2017 | Thomas | G06F 11/3668 |
| 2018/0129479 | A1* | 5/2018 | McPherson | G06F 8/63 |
| 2020/0293354 | A1 | 9/2020 | Song | |
| 2020/0304526 | A1 | 9/2020 | Abraham | |
| 2020/0387356 | A1 | 12/2020 | Davis | |
| 2021/0048995 | A1* | 2/2021 | Myers | G06F 8/60 |
| 2021/0103450 | A1 | 4/2021 | Prasad | |
| 2021/0232620 | A1* | 7/2021 | Stanley | G06N 3/045 |
| 2021/0279350 | A1 | 9/2021 | Walsh | |
| 2022/0171648 | A1* | 6/2022 | Rodriguez | G06F 9/5072 |
| 2022/0229649 | A1* | 7/2022 | Myers | G06F 9/455 |
| 2022/0415012 | A1* | 12/2022 | Karmakar | G06T 7/73 |

OTHER PUBLICATIONS

Gandhi et al., "Image Matters: Detecting Offensive and Non-Compliant Content / Logo in Product Images", May 2019, ResearchGate (Year: 2019).*

Paraiso et al., "Model-Driven Management of Docker Containers", 2016, IEEE (Year: 2016).*

Jaspe-Villanueva et al., "Web-based Exploration of Annotated Multi-Layered Relightable Image Models", 2021, ACM (Year: 2021).*

Chen et al., "Tree-to-tree Neural Networks for Program Translation", arXiv:1802.03691v3 [cs.AI] Oct. 26, 2018, 16 pages.

Henkel et al., "A Dataset of Dockerfiles", arXiv:2003.12912v1 [cs.SE] Mar. 28, 2020, 5 pages.

Henkel et al., "Learning from, Understanding, and Supporting DevOps Artifacts for Docker", 2020 IEEE/ACM 42nd International Conference on Software Engineering (ICSE), 12 pages.

Hu et al., "Deep Code Comment Generation*", 2018 ACM/IEEE 26th International Conference on Program Comprehension, ICPC '18, May 27-28, 2018, Gothenburg, Sweden, 11 pages.

Lachaux et al., "Unsupervised Translation of Programming Languages", arXiv:2006.03511v3 [cs.CL] Sep. 22, 2020, 21 pages.

Mell et al., "The NIST Definition of Cloud Computing", NIST National Institute of Standards and Technology U.S. Department of Commerce, Special Publication 800-145, Sep. 2011, 7 pages.

Turk et al., "DeltaSherlock: Identifying Changes in the Cloud", 2016 IEEE International Conference on Big Data (Big Data), ©2016 IEEE, 10 pages.

"Patent Cooperation Treaty PCT Notification of Transmittal of the International Search Report and the Written Opinion of the International Searching Authority, or the Declaration", Applicant's file reference EIE230282PCT, International application No. PCT/CN2023/088902, International filing date Apr. 18, 2023, dated Jun. 21, 2023, 7 pages.

* cited by examiner

GENERATING COMPLIANT CONTAINER IMAGES VIA EMBEDDINGS

BACKGROUND OF THE INVENTION

The present invention relates generally to the field of cloud computing, and more particularly to importing containers from external sources by utilizing latent feature embeddings regarding layers of various containers.

Containers are executable units of software in which application code is packaged, along with its libraries and dependencies, in ways so that it can be run on a variety of devices and environments. Compliancy, in the computing domain, dictates what software is acceptable to run and what functions or commands are permitted within a given device or environment. While containers offer portability, compliancy is not ensured as each organization will have different policies regarding which feature or functions of the software of the container is permitted.

SUMMARY

A method, computer systems and program product to import non-compliant container images is provided. A processor receives a non-compliant container image, wherein the container image is not compliant with a target computing environment. A processor extracts a one or more embeddings from the non-compliant container image. A processor compares the one or more embeddings from the non-compliant container image to a plurality of one or more embeddings from an image catalog. A processor identifies a similar image from the image catalog based on the comparison of layer embeddings from the non-compliant container image and the similar image. A processor deploys the similar image in the target computing environment.

DETAILED DESCRIPTION

Figure 1:
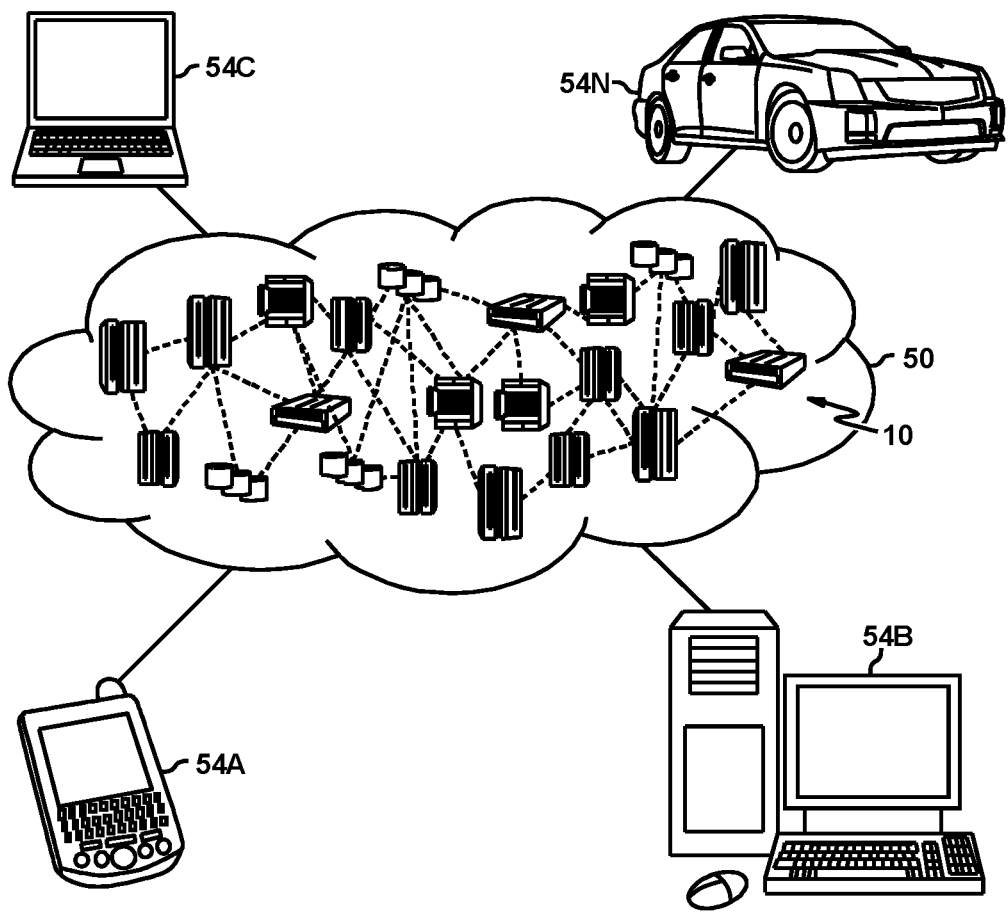
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
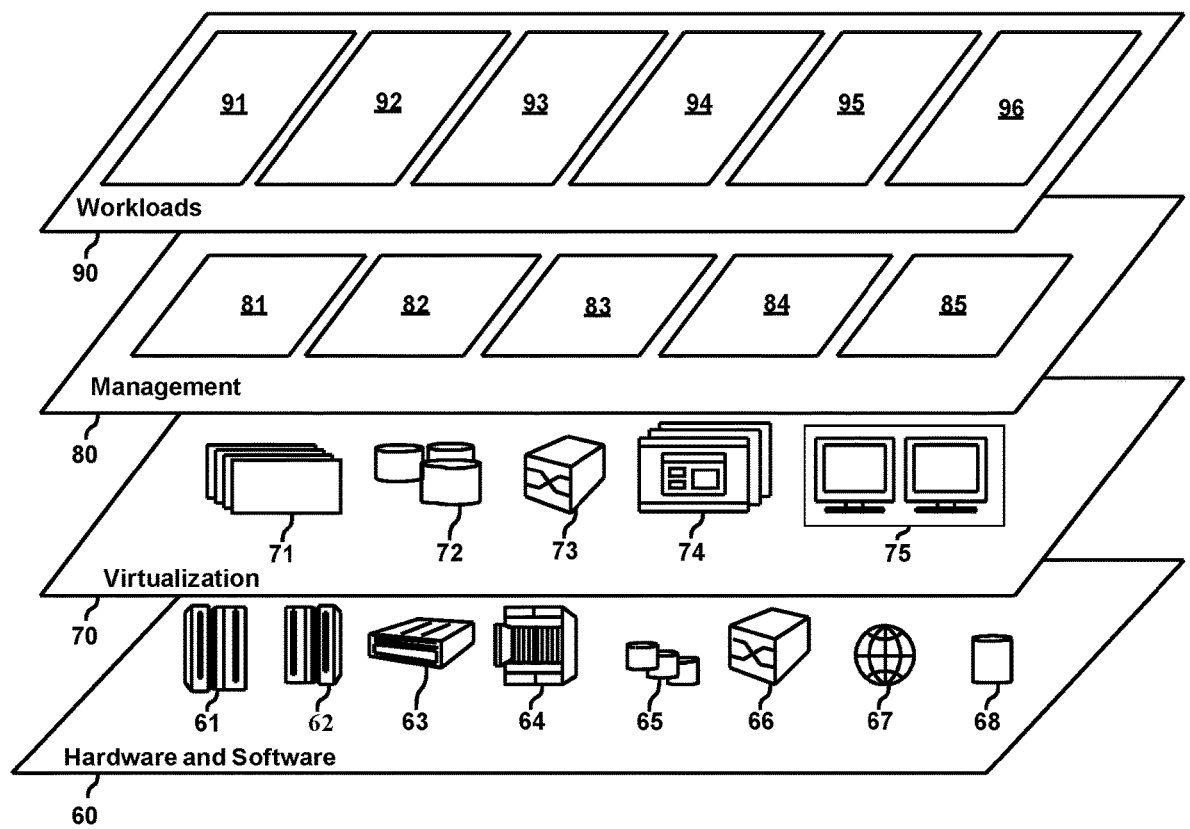
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Metering and Pricing 81 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 82 provides access to the cloud computing environment for consumers and system administrators. Service level management 83 provides cloud computing resource allocation and management such that required service levels are met. Service Level Agreement (SLA) planning and fulfillment 84 provide pre-arrangement for, and procurement of, cloud computing resources for which a future requirement is anticipated in accordance with an SLA. Resource provisioning 85 provides dynamic procurement of computing resources and other resources that are utilized to perform tasks within the cloud computing environment.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and microservices 96. Microservices 96 are workloads that provide various component operations or functions for a larger software package or platform.

Figure 3:
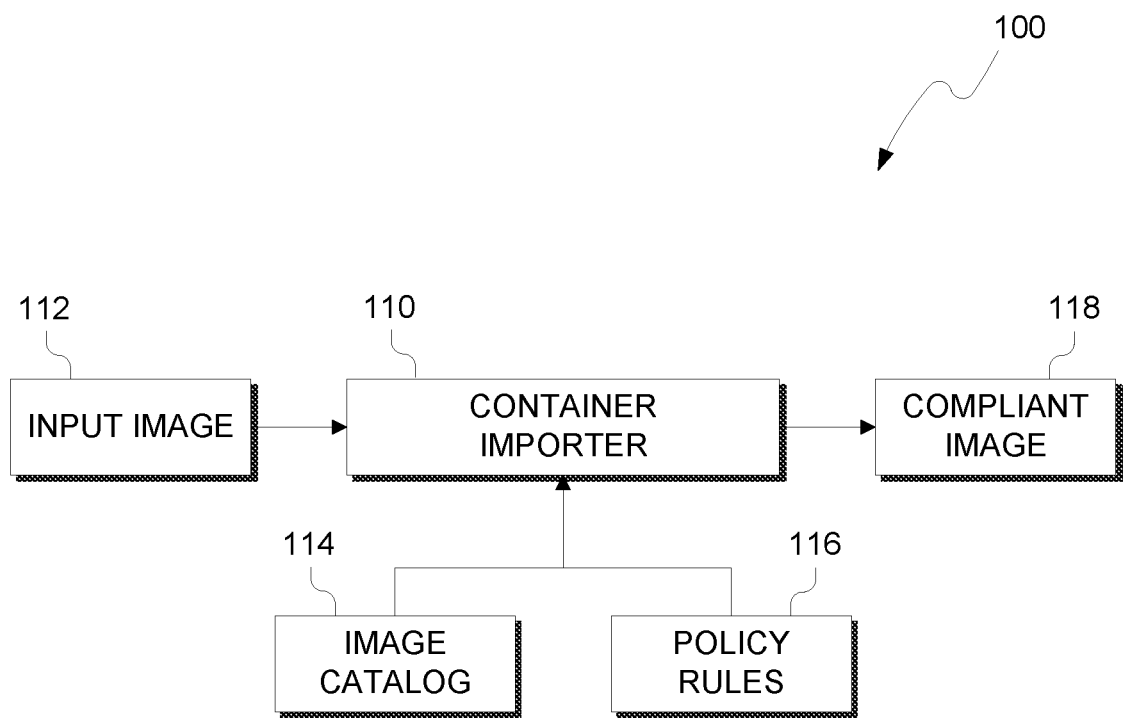
FIG. 3 illustrates a computing environment for importing non-compliant container images to a target computing environment.
Figure 4:
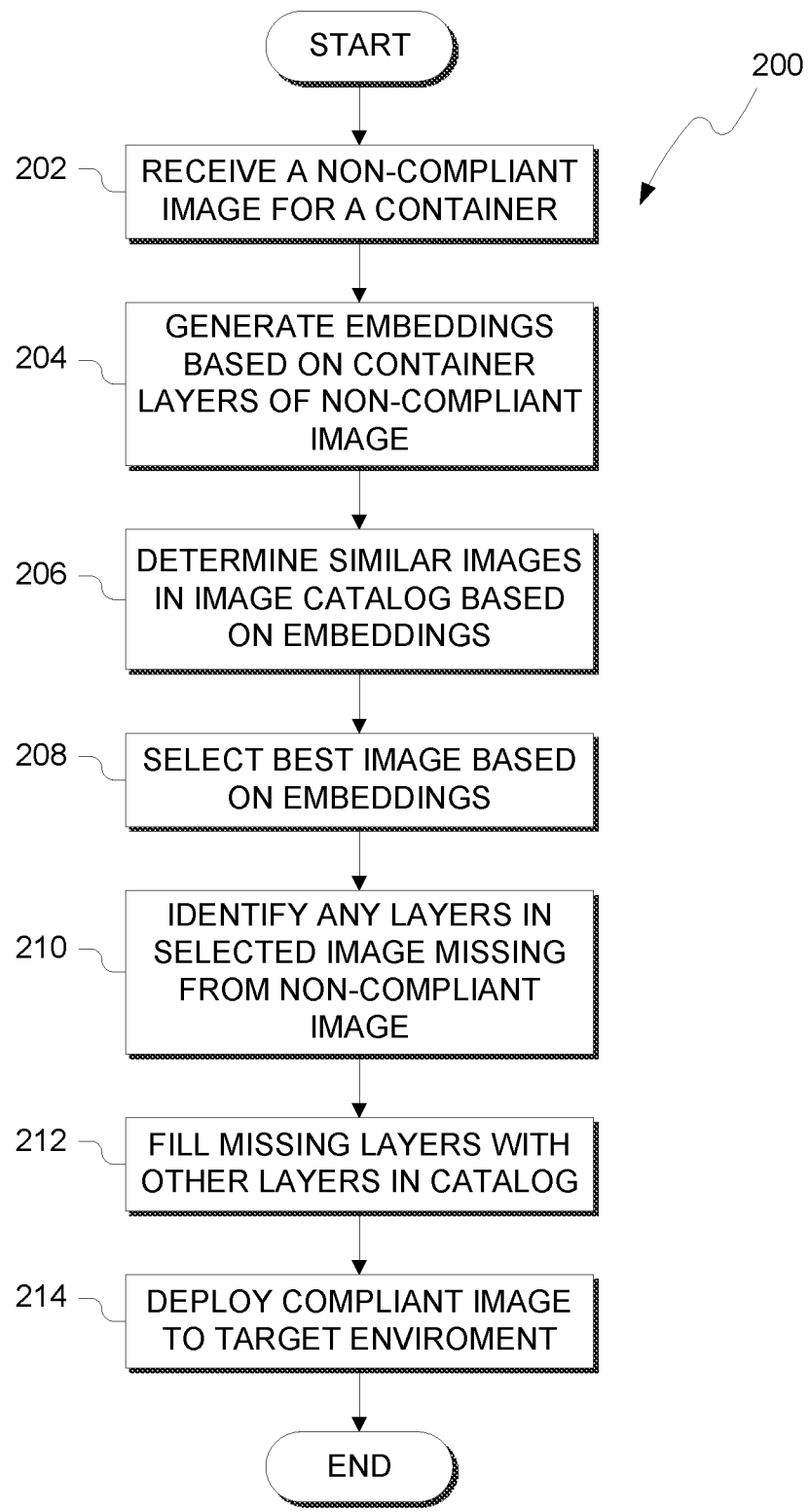
FIG. 4 illustrates operational processes of importing container to a target computing environment.

FIG. 3 is a functional block diagram illustrating a computing environment, generally designated 100, in accordance with one embodiment of the present invention. Computing environment 100 includes container importer 110, input image 112, image catalog 114, policy rules 116, and compliant image 118.

In various embodiments of the present invention, container importer 110 is a computing device that can be a standalone device, a server, a laptop computer, a tablet computer, a netbook computer, a personal computer (PC), or a desktop computer. In another embodiment, container importer 110 represents a computing system utilizing clustered computers and components to act as a single pool of seamless resources. In general, container importer 110 can be any computing device or a combination of devices with access to input image 112, image catalog 114, policy rules 116, and compliant image 118. container importer 110 may include internal and external hardware components, as depicted and described in further detail with respect to FIG. 6.

In this exemplary embodiment, input image 112, image catalog 114, policy rules 116, and compliant image 118 are stored on container importer 110. However, in other embodiments, input image 112, image catalog 114, policy rules 116, and compliant image 118 may be stored externally and accessed through a communication network (not shown). The network can be, for example, a local area network (LAN), a wide area network (WAN) such as the Internet, or a combination of the two, and may include wired, wireless, fiber optic or any other connection known in the art. In general, the network can be any combination of connections and protocols that will support communications, in accordance with a desired embodiment of the present invention.

In various embodiments, container importer 110 is provided input image 112 in order to create a compliant container image for a target distributed computing environment, such as cloud computing environment 50. Input image 112 is a container image used to deploy applications in a distributed computing environment. In various embodiments, input image 112 was developed in a different distributed computing environment than targeted cloud computing environment 50. As such, input image 112 may include functions, features and other configurations or policies that may not be utilized by the targeted cloud computing environment 50. For example, depending on the operating system of the virtual machines deployed, both environments may be used different package mangers for building applications, which would prevent input image 112 from being imported into a compliant image 118 for cloud computing environment 50. Additionally, input image 112 may require root access to properly execute, which may be against polices of the target cloud computing environment 50, thereby making input image 112 non-compliant. Furthermore, input image 112 may include packages or other code that depends on packages or code that is not supported or approved to be deployed on the target cloud computing environment 50, thereby making input image 112 non-complaint. One of ordinary skill in the art will appreciate that input image 112 may be non-complaint within the target cloud computing environment 50 for any reason, without deviating from the invention.

Embodiments of the present invention provide a methodology and system to import container images developed for different computing environments in order to be deployed in a target distributed computing environment. By determining a series of embeddings for the image to be imported, embodiments of the present invention can identify similar images in an image catalog based on a comparison of the embeddings. By using the image catalog to build a compliant image, the base image of the image to be imported while building the new image with necessary additions or changes needed to be compliant with the target distributed computing environment. Furthermore, embodiments of the present invention also apply embeddings on layer of the container image and can select similar layers from other container images that are compliant within a given computing environment.

In various embodiments, container importer 110 generates a set of embeddings for input image 112. Embeddings are a subset of features for a given set of data. For example, a container image includes a set of files needed for deployment. Embeddings represent a conversion of the numerous data points that represent the file structure of a container image to a smaller subset of data values represented in vector format. Container importer 110 includes an encoder neural network which consists of an input layer, a hidden layer and an output layer. The input layer is fed various data points from input image 112. The output layer of the neural network reduces the input layer to only a few output values. The hidden layer is trained and developed to map the various inputs founds in input image 112 to the output layer of the neural network. In various embodiments, container importer 110 generates various output layer data points derived from input image 112 include, but are not limited to, file names and directory structure of input image 112, hash values for the files of input image 112, file names of leaf nodes (i.e., the lowest level in the directory structure) of input image 112, and any build or other commands to construct the container of input image 112.

In various embodiments, container importer 110 determines embeddings for images stored in image catalog 114. Image catalogue 114 includes various container images and build files that can be deployed or are otherwise compliant to deployed on targeted cloud computing environment 50. As previously discussed, input image 112 was developed for deployment in a different computing environment than targeted cloud computing environment 50. As such, input image 112 may use statements not supported by targeted cloud computing environment 50, whereas image catalog 114 includes containers that are supported by targeted cloud computing environment 50. Utilizing the same neural network to generate embeddings for input image 112, container importer 110 also determines embeddings for images stored in image catalog 114 derived from data points of the images in image catalog 114 include, but are not limited to, file names and directory structure of images in image catalog 114, hash values for the files of images in image catalog 114, file names of leaf nodes (i.e., the lowest level in the directory structure) of images in image catalog 114, and any build or other commands to construct the container of images in image catalog 114.

Based on a comparison of embeddings for input image 112 to the embeddings for images stored in image catalog 114, container importer 110 determines a similar image stored in image catalog 114 to input image 112. Container importer 110 compares the embeddings for the input image 112 to embeddings for each image stored in image catalog 114. Container importer 110 compares the values of the embeddings in a vector space, with a dimension in the vector space corresponding to an embedding type (e.g., file structure, hash value of files, file names and build commands). Container importer 110 selects the closest image stored in image catalog 114 to input image 112 within the vector space, with the closest image in the vector space being considered the most similar. The closest image is then deployed as compliant image 118 in cloud computing environment 50. In some instances, if no image is within a certain distance of the feature space for the embeddings of input image 112, then container importer 110 generates an alert stating no similar image in image catalog 114 can be found.

In various embodiments, container importer 110 combines images, or parts of images from image catalog 114, to generate compliant image 118. In various scenarios, container images may be composed of various layers. A container includes various build commands that construct the image when deployed in a computing environment. The various commands generate layers in the container that provide various resources and functions to the other layers of the container. For example, a container could include build commands in the following order: 'FROM OS:1.01', 'ADD run.sh/', 'VOLUME/data', and 'CMD ["/.run.sh" ]'. In the above example, each command builds a layer in the container image. The FROM command adds a base image layer that indicates the operating system, OS version 1.01. The ADD command adds a new layer to the container that includes a provided shell script "run.sh". The VOLUME command adds a file structure '/data' to the container and the CMD command executes the shell script to deploy the container.

As discussed herein, container importer 110 determines similar images based on embeddings derived from the overall container structure. In some embodiments, container importer 110 determines embeddings on a layer-by-layer basis of the container images of input image 112 and images from image catalog 114. For each layer, container importer 110 determines embeddings for the layer, or layer embeddings, of both the input image 112 and candidate images from image catalog 114. As such, container importer 110 can select layers from other images in image catalog 114 to construct compliant image 118. After identifying the closest overall image, as discussed herein, container importer 110 evaluates each layer of the closet image found in image catalog. If a layer of another image has closer embeddings that the overall closet image, then container importer 110 replaces the layer of the compliant image 118 with the layer from the other image, thereby generating a new container image that more closely matches input image 112, while being compliant within the target computing environment 50. In some scenarios, image catalog 114 may not have an image that includes each layer of input image 112. In such scenarios, container importer 110 evaluates image catalog 114 for an image whose embeddings are the closest to the missing layer.

In some embodiments, container importer 110 compares input image 112 to policy rules 116. Policy rules 116 includes various rules and requirements for containers that are deployed in cloud computing environment 50. For example, cloud computing environment 50 may use different package manager tools for building containers. Policy rules 116 includes a rule to ensure compliant image 118 includes the correct calls to repositories so the container can be built and deployed in cloud computing environment 50. In circumstances where input image 112 includes commands, packages, files that violates any policies in policy rules 116, then container importer 110 identifies the closest image or layer from image catalog that matches the input image 112, as discussed herein. Additionally, container importer 110 also evaluates that compatible image 118 is compliant with policy rules 116. If the compatible image 118 violates any policy rules 116, then container importer 110 identifies which layer has the violation and selects another matching layer from an image in image catalog 114 such that compatible image 118 is compliant with policy rules 116.

In some scenarios, container importer 110 identifies no suitable image, or component layer, can be found in image catalog 114. In some instances, input image 112 may use a different package manager or other software component in building the container. In other instances, a layer or the image of input image 112 may violate a policy in policy rules 116. For example, the input image 112, or any layer, may require root or elevated privileges to properly be deployed in cloud computing environment 50. In this instance, given policy rules 116 forbid containers from having elevated access and a replacement image or layer could not be found in image catalog 114, then container importer 110 modifies the build layer of the resultant compatible image 118 such that compatible image 118 can be deployed in cloud computing environment 50 but not violate any policy rules 116. In various embodiments, if container importer 110 identifies no suitable image, or component layer, can be found in image catalog 114, then container importer 110 modifies the build layer of compatible image 118 such that compatible image 118 can be deployed in cloud computing environment 50 but not violate any policy rules 116. For example, if an image or layer utilizes a different package manager, then container importer 110 identifies an approved repository with a similar image or layer and updating the build commands of compatible image 118 to retrieve the approved package for the repository.

FIG. 2 illustrates operational processes of container importer 110, in accordance with an embodiment of the present invention. In process 202, container importer 110 receives a non-compliant image for a container to be deployed in cloud computing environment 50. As discussed herein, input image 112 is retrieved from a repository or other source and was developed to be deployed in another cloud computing environment that many use different containerization methodologies and protocols. Input image 112 is non-compliant for use in cloud computing environment 50 inasmuch that at least some portion of input image 112 (e.g., such as application data, project files, or containerization) is not supported by cloud computing environment 50. In process 204, container importer 110 generates embeddings for the non-compliant image. As discussed herein, container importer 110 utilizes an encoder neural network which comprises three layers: input, hidden and output. The input layer includes various data points associated with input image 112, such as file names, sizes, containerization, hash values, function names, libraries and any other component of input image 112. The output layer consists of various embeddings that will be extracted and quantified into vector values from the input layer. The hidden layer is an intermediary between the input and output layers. Via supervised learning, container importer 110 modifies the hidden layer by matching known images. As matches are provided, container importer 110 trains the encoder to produce desired embeddings in the output layer. Once trained, container importer 110 generates embeddings for the non-compliant image. As discussed herein example embeddings include, but are not limited to, file names and directory structure of images in image catalog 114, hash values for the files of images in image catalog 114, file names of leaf nodes (i.e., the lowest level in the directory structure) of images in image catalog 114, and any build or other commands to construct the container of images in image catalog 114.

In process 206, container importer 110 determines similar images in image catalog 114 based on the embeddings of the non-compliant image. As discussed herein, image catalog 114 include various images that are compliant and deployable on cloud computing environment 50. Prior to importing a non-compliant image, container importer 110 determines embeddings for the various compliant images in image catalog 114 in a similar manner to process 204 to input image 112. In process 208, container importer 110 selects from image catalog 114 the closest image in the catalog to input image 112. Embeddings from each image in the catalog and input image 112 are compared in a vector space, with each dimension in the vector space associated with an embedding determined by the encoder neural network. Container importer 110 selects the image that is closest in the vector space to the embeddings of input image 112. If no image is within a certain distance within the vector space, then container importer 110 indicates that no suitable image can be found in the catalog.

In process 210, container importer 110 identifies any gaps or missing parts regarding the catalog image that is selected in process 208. If an embedding is outside a threshold range from the same embedding in the input image 112, then container importer 110 determines that the image has a gap and needs additional changes prior to deployment. If an embedding indicates a gap, then container importer 110 identifies an image in image catalog 114 that is closest to the input image for only the gap associated with the embedding. For example, if the build instructions for the container image cause the gap, then container importer 110 identifies a second image in image catalog 114 with the closest "build" embedding. Then, container importer 110 fills this gap by using the container build instructions found in the second image with the first image's other components, to create a new container image. In process 212, container importer 110 fills in any gaps based on the type of embedding that was out of range. In process 214, container importer 110 deploys the image to target cloud computing environment 50.

Figure 5:
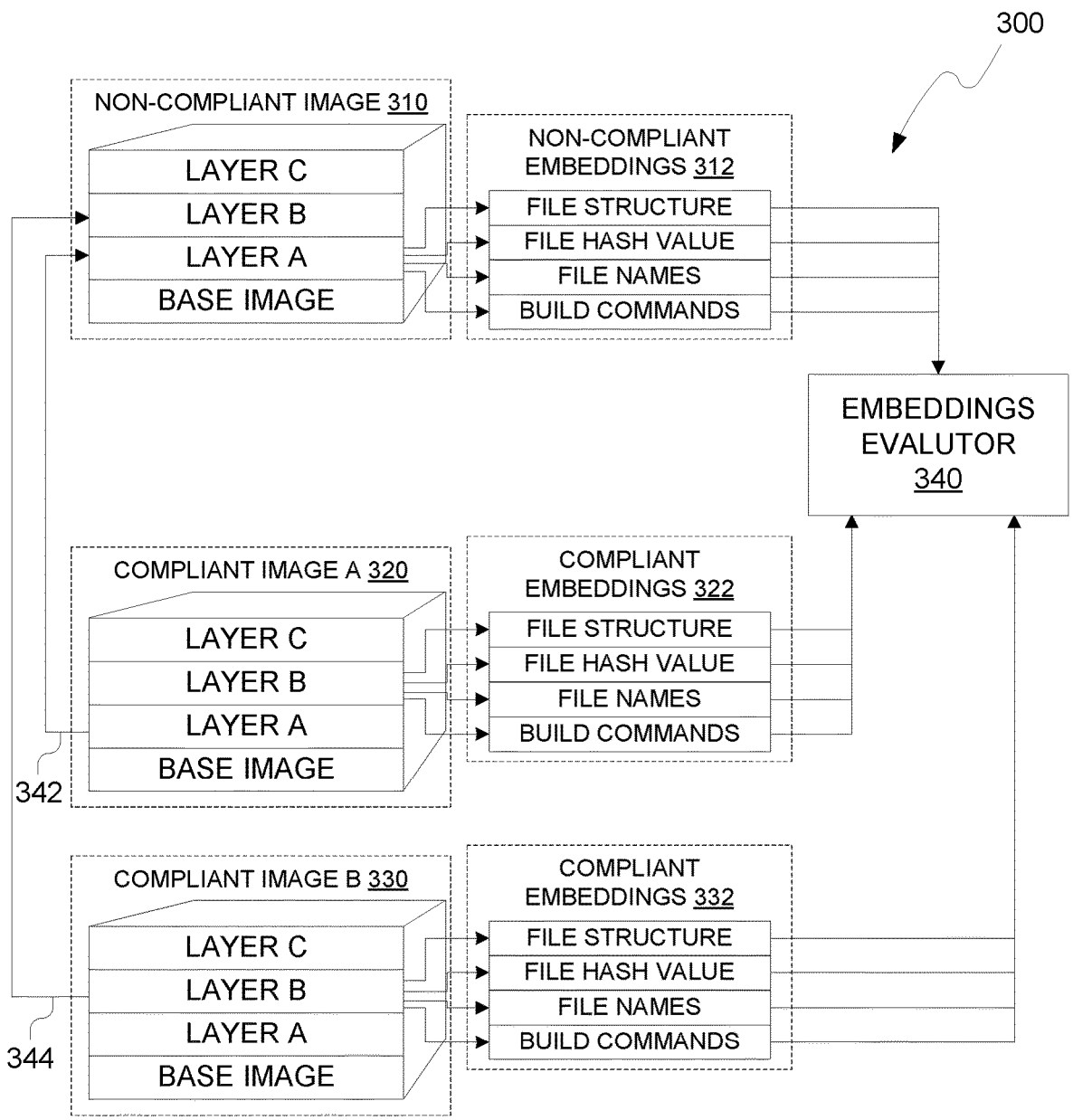
FIG. 5 illustrates an example diagram of modifying the container for insufficient compliance.

FIG. 5 depicts an example diagram, generally designated 300, of container importer 110 constructing compatible image 118 from compliant images 320 and 330 retrieved from image catalog 114. In this example, non-compliant image 310 is not compliant with policy rules 116. As discussed herein, container importer 110 generates embeddings for non-compliant image 310. In this example, non-compliant embeddings 312 are embeddings for layer A of non-compliant image 310, which include four embeddings of latent features of the layer including file structure, file hash values, files names and build commands deployed within layer A of non-compliant image 310. Additionally, container importer 110 generates compliant embeddings 322 and 332 for two candidate images, compliant image A 320 and compliant image B 330, respectively, in image catalog 114 that are compliant with target computing environment 50.

In various embodiments, embeddings evaluator 340 is a module of container importer 110 that compares various compliant embeddings 322 and 332 from images in image catalog 114 to non-compliant embeddings 312. As discussed herein, compliant embeddings 322 and 332 and non-compliant embeddings 312 are compared in a vector space based on the different factors of the embeddings of the layers (e.g., structure, file hash values, files names and build commands of the layer). The closest compliant layer within the vector space to that of the non-compliant embeddings 312 is selected as the best candidate from replacement of the layer in non-compliant image 310. In this example, layer A of compliant image A 320 has been identified as being the closest match to layer A of non-compliant image 310. As such, container importer performs a modification 342 to non-compliant image 310 by importing layer A from compliant image A 320 to layer A of non-compliant image 310. However, in this example, Layer B of compliant image A 320 is not the closest match to layer B of non-compliant image 310. Instead, embeddings evaluator 340 identifies another candidate image, complaint image B 330, includes a closer match to the layer. As such, container importer performs a modification 344 to non-compliant image 310 by importing layer B from compliant image B 330 to layer B of non-compliant image 310. Therefore, transforming non-compliant image 310 into a compliant image.

Figure 6:
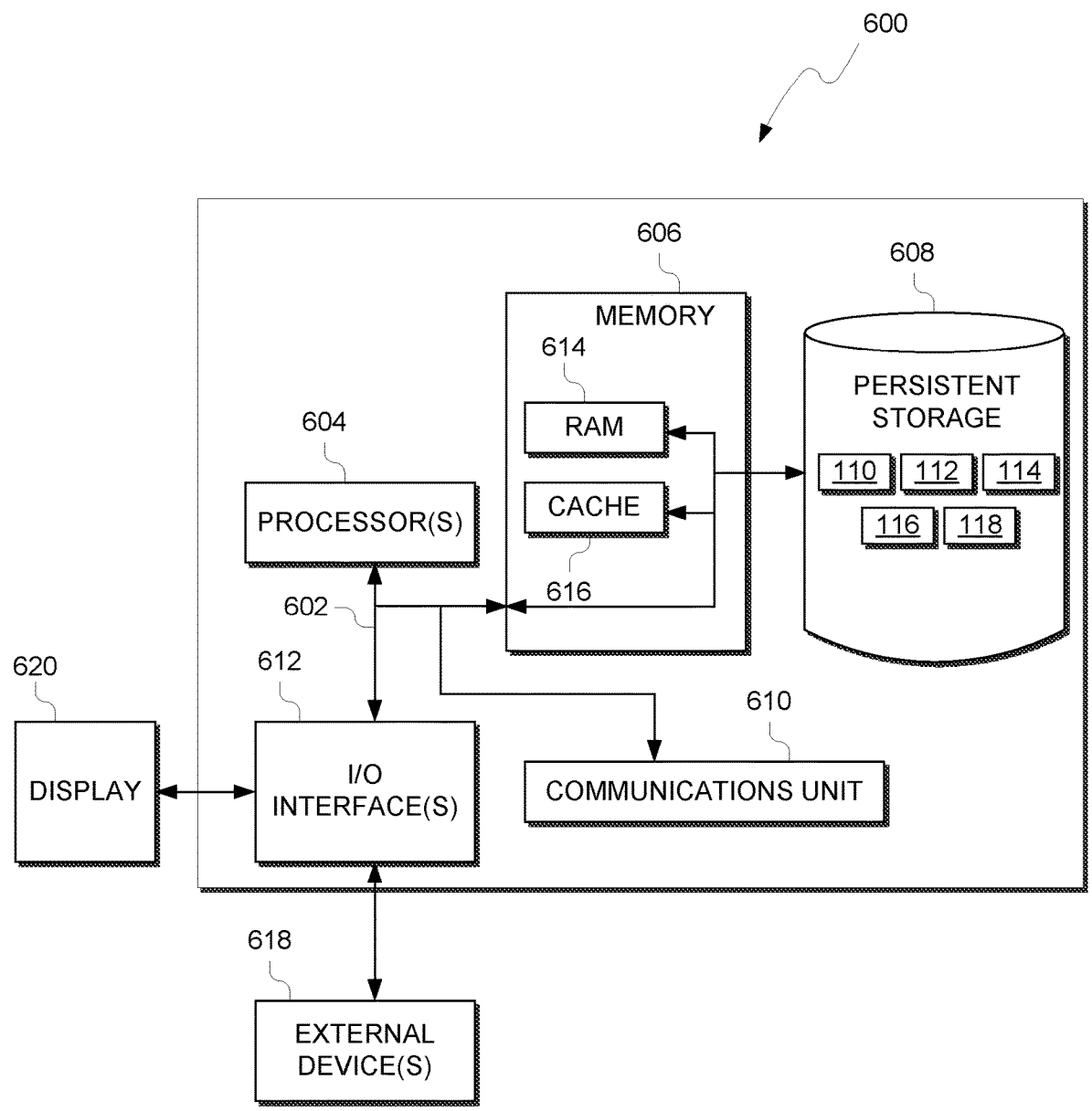
FIG. 6 depicts a block diagram of components of the computing device executing a container importer, in accordance with an exemplary embodiment of the present invention.

FIG. 6 depicts a block diagram of a computing device 600, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Container importer 110, input image 112, image catalog 114, policy rules 116, and compliant image 118 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of a network. In these examples, communications unit 610 includes one or more network interface cards. Communications unit 610 may provide communications through the use of either or both physical and wireless communications links. Container importer 110, input image 112, image catalog 114, policy rules 116, and compliant image 118 may be downloaded to persistent storage 608 through communications unit 610.

I/O interface(s) 612 allows for input and output of data with other devices that may be connected to computing device 600. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., container importer 110, input image 112, image catalog 114, policy rules 116, and compliant image 118, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
   receiving, by one or more processors, a non-compliant container image, wherein the non-compliant container image is not compliant with a target computing environment;
   extracting, by the one or more processors, a one or more embeddings from the non-compliant container image;
   comparing, by the one or more processors, the one or more embeddings from the non-compliant container image to a plurality of one or more embeddings from an image catalog;
   identifying, by the one or more processors, that a layer of the non-compliant container image violates at least one policy rules for the target computing environment;
   identifying, by the one or more processors, a similar image from the image catalog based on the comparison of layer embeddings from the non-compliant container image and the similar image;

extracting, by the one or more processors, a one or more layer embeddings from at least one layer of the non-compliant container image;

comparing, by the one or more processors, the one or more layer embeddings to a plurality of one or more layer embeddings for layers of images retrieved from the image catalog;

replacing, by the one or more processors, a layer in the non-compliant container image with a layer from the similar image retrieved from the image catalog based on the comparison of the one or more layer embeddings to the plurality of one or more layer embeddings for layers of images retrieved from the image catalog; and deploying, by the one or more processors, the similar image in the target computing environment.

2. The method of claim 1, wherein the one or more embeddings are extracted from one or more of the following features of the non-compliant container image: file structure of the non-compliant container image, file hash values non-compliant container image, file names of the non-compliant container image, and build commands of the non-compliant container image.

3. The method of claim 1, wherein the layer violates a policy rule regarding a non-compliant package.

4. The method of claim 3, the method further comprising:
modifying, by the one or more processors, one or more build commands of the non-compliant container image to retrieve a second package from an approved package manager.

5. The method of claim 1, wherein the layer violates a policy rule regarding elevated access.

6. A computer program product comprising:
one or more computer-readable storage medium and program instructions stored on the one or more computer-readable storage medium, the program instructions comprising:
program instructions to receive a non-compliant container image, wherein the non-compliant container image is not compliant with a target computing environment;
program instructions to extract a one or more embeddings from the non-compliant container image;
program instructions to compare the one or more embeddings from the non-compliant container image to a plurality of one or more embeddings from an image catalog;
program instructions identify that a layer of the non-compliant container image violates at least one policy rules for the target computing environment;
program instructions to identify a similar image from the image catalog based on the comparison of layer embeddings from the non-compliant container image and the similar image;
program instructions to extract a one or more layer embeddings from at least one layer of the non-compliant container image;
program instructions to compare the one or more layer embeddings to a plurality of one or more layer embeddings for layers of images retrieved from the image catalog;
program instructions to replace a layer in the non-compliant container image with a layer from the similar image retrieved from the image catalog based on the comparison of the one or more layer embeddings to the plurality of one or more layer embeddings for layers of images retrieved from the image catalog; and
program instructions to deploy the similar image in the target computing environment.

7. The computer program product of claim 6, wherein the one or more embeddings are extracted from one or more of the following features of the non-compliant container image: file structure of the non-compliant container image, file hash values non-compliant container image, file names of the non-compliant container image, and build commands of the non-compliant container image.

8. The computer program product of claim 6, wherein the layer violates a policy rule regarding a non-compliant package.

9. The computer program product of claim 8, program instructions further comprising:
program instructions to modify one or more build commands of the non-compliant container image to retrieve a second package from an approved package manager.

10. The computer program product of claim 6, wherein the layer violates a policy rule regarding elevated access.

11. A computer system comprising:
one or more computer processors;
one or more computer readable storage medium; and
program instructions stored on the computer readable storage medium for execution by at least one of the one or more processors, the program instructions comprising:
program instructions to receive a non-compliant container image, wherein the non-compliant container image is not compliant with a target computing environment;
program instructions to extract a one or more embeddings from the non-compliant container image;
program instructions to compare the one or more embeddings from the non-compliant container image to a plurality of one or more embeddings from an image catalog;
program instructions identify that a layer of the non-compliant container image violates at least one policy rules for the target computing environment;
program instructions to identify a similar image from the image catalog based on the comparison of layer embeddings from the non-compliant container image and the similar image;
program instructions to extract a one or more layer embeddings from at least one layer of the non-compliant container image;
program instructions to compare the one or more layer embeddings to a plurality of one or more layer embeddings for layers of images retrieved from the image catalog;
program instructions to replace a layer in the non-compliant container image with a layer from the similar image retrieved from the image catalog based on the comparison of the one or more layer embeddings to the plurality of one or more layer embeddings for layers of images retrieved from the image catalog; and
program instructions to deploy the similar image in the target computing environment.

12. The computer system of claim 11, wherein the one or more embeddings are extracted from one or more of the following features of the non-compliant container image: file structure of the non-compliant container image, file hash values non-compliant container image, file names of the non-compliant container image, and build commands of the non-compliant container image.

13. The computer system of claim 11, wherein the layer violates a policy rule regarding a non-compliant package.

14. The computer system of claim 13, program instructions further comprising:
 program instructions to modify one or more build commands of the non-compliant container image to retrieve a second package from an approved package manager.

\* \* \* \* \*